(12) United States Patent
Qian et al.

(10) Patent No.: US 9,471,160 B2
(45) Date of Patent: Oct. 18, 2016

(54) MOUSE PADS AND METHOD FOR USING THE SAME

(71) Applicant: Beijing FUNATE Innovation Technology Co., LTD., Beijing (CN)

(72) Inventors: Li Qian, Beijing (CN); Yu-Quan Wang, Beijing (CN); Chen Feng, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 34 days.

(21) Appl. No.: 13/920,060

(22) Filed: Jun. 17, 2013

(65) Prior Publication Data

US 2014/0152561 A1    Jun. 5, 2014

(30) Foreign Application Priority Data

Dec. 4, 2012    (CN) .......................... 2012 1 0512053

(51) Int. Cl.
| | |
|---|---|
| *G06F 3/033* | (2013.01) |
| *G06F 3/0354* | (2013.01) |
| *G06F 3/039* | (2013.01) |
| *G06F 3/044* | (2006.01) |
| *G06F 3/0488* | (2013.01) |

(52) U.S. Cl.
CPC ......... *G06F 3/03547* (2013.01); *G06F 3/0395* (2013.01); *G06F 3/044* (2013.01); *G06F 3/04886* (2013.01); *G06F 2203/04112* (2013.01)

(58) Field of Classification Search
CPC ............. G06F 3/03547; G06F 3/0395; G06F 3/04886; G06F 3/044; G06F 2203/04112
See application file for complete search history.

(56) References Cited

U.S. PATENT DOCUMENTS

| | | | |
|---|---|---|---|
| 5,870,083 A * | 2/1999 | Shieh ............................. | 345/173 |
| 2009/0211891 A1* | 8/2009 | Lai et al. ...................... | 200/512 |
| 2010/0328261 A1* | 12/2010 | Woolley et al. ............... | 345/174 |
| 2011/0234503 A1* | 9/2011 | Fitzmaurice et al. ........ | 345/173 |
| 2011/0304800 A1 | 12/2011 | Liu et al. | |
| 2012/0212421 A1* | 8/2012 | Honji ............................ | 345/173 |

FOREIGN PATENT DOCUMENTS

| | | |
|---|---|---|
| CN | 101876766 | 11/2010 |
| TW | M311946 | 5/2007 |
| TW | 200807284 | 2/2008 |
| TW | 200939092 | 9/2009 |
| TW | 201201071 | 1/2012 |

\* cited by examiner

*Primary Examiner* — Matthew Sim
(74) *Attorney, Agent, or Firm* — Zhigang Ma (57) ABSTRACT

A mouse pad includes a body having a surface, a touch panel and a processor is provided. The touch panel is located on the surface and electrically connected to the processor. The processor receives signals from the touch panel and can divide the touch panel into a first area and a second area, the first area and the second area respectively acting as a left mouse button (for left clicks) and as a right mouse button (for right clicks). Methods for using the mouse pad are also provided.

3 Claims, 7 Drawing Sheets

MOUSE PADS AND METHOD FOR USING THE SAME

RELATED APPLICATIONS

This application claims all benefits accruing under 35 U.S.C. §119 from China Patent Application No. 201210512053.2, filed on Dec. 4, 2012 in the China Intellectual Property Office, the disclosure of which is incorporated herein by reference.

BACKGROUND

1. Technical Field

The present invention relates to a mouse pad and a method for using the mouse pad.

2. Discussion of Related Art

A mouse is usually deployed to a desktop computer or a notebook PC to control the desktop computer or the notebook PC.

However, in using the mouse, the user has to grasp the mouse and constantly move the wrist. Thus, the repetitive strain injuries can be happened on wrists of the user.

What is needed, therefore, is to provide a mouse pad and a method for using the mouse pad, which can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
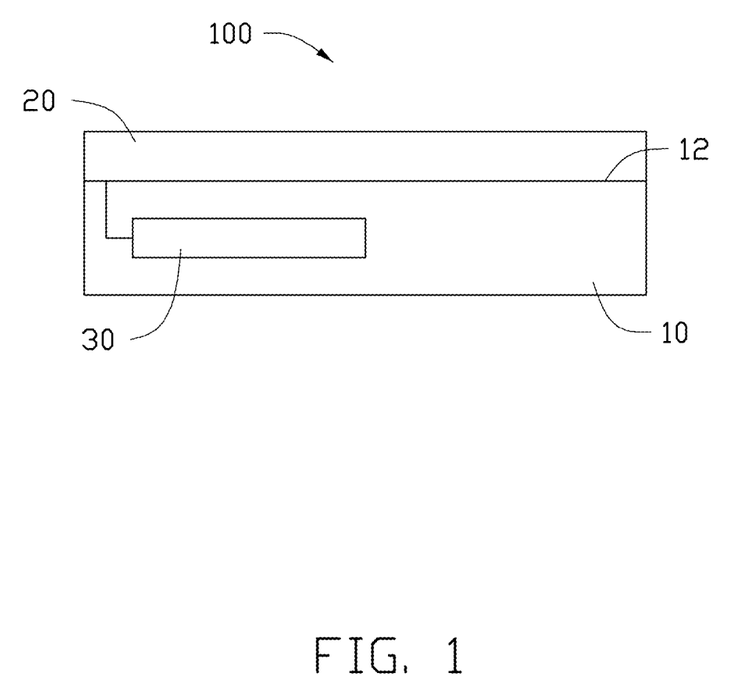
FIG. 1 is a schematic view of one embodiment of a mouse pad.
Figure 2:
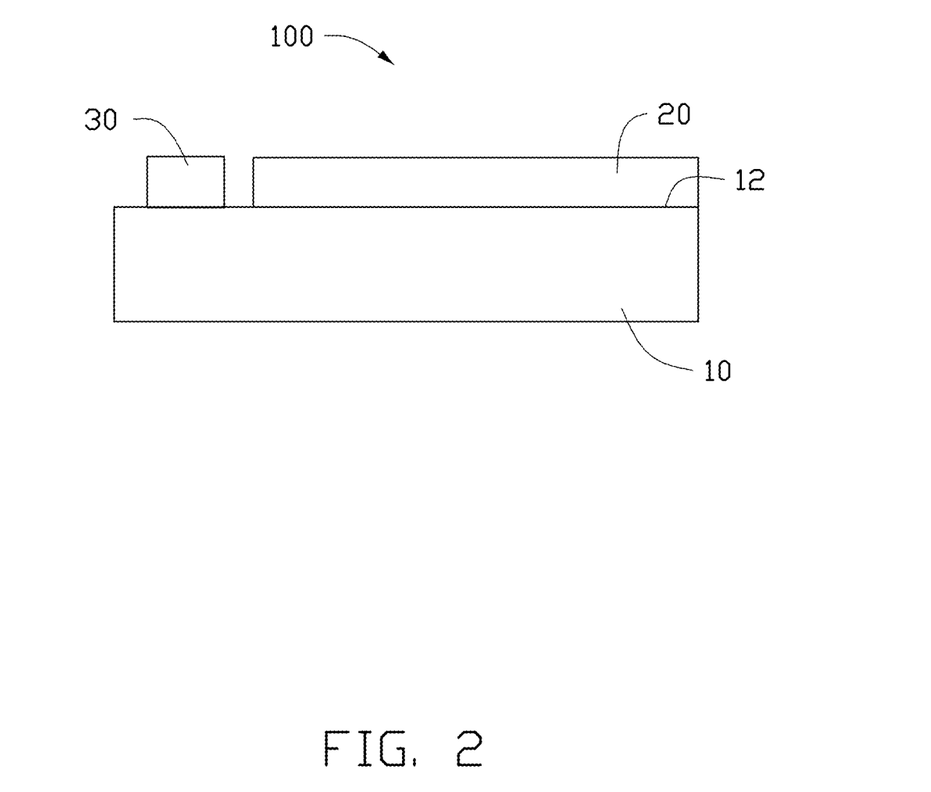
FIG. 2 is a schematic view of another embodiment of a mouse pad.
Figure 3:
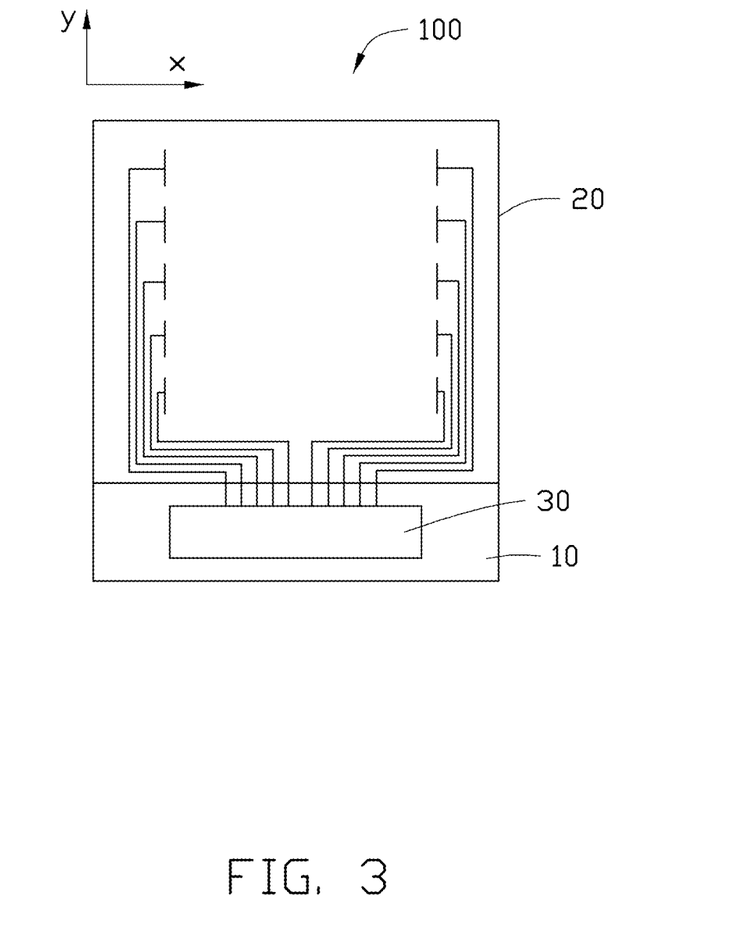
FIG. 3 is a vertical view of the mouse pad of FIG. 2.

Referring to FIGS. 1-3, a mouse pad 100 with touch-control functions of one embodiment is provided. The mouse pad 100 includes a body 10 having a surface 12, a touch panel 20 and a processor 30 electrically connected to the touch panel 20. The body 10 supports the touch panel 20 and the processor 30.

Referring to FIG. 1, in one embodiment, the touch panel 20 is located on and over the entire area of the surface 12 of the body 10, and the processor 30 is located within the body 10. Thus, the whole surface 12 of the body 10 can have touch-control functions.

Referring to FIGS. 2 and 3, in another embodiment, the touch panel 20 is located on a part of the area of the surface 12, and the processor 30 is located on another part of the surface 12 of the body 10. Thus, the part of the area of the surface 12 can have touch-control functions.

The processor 30 detects touches on the touch panel 20 and transmits signals to an electronic device. The signals can be transmitted to the electronic device by an external data line or via wireless communication, and the electronic device can thus be controlled by the mouse pad 100. In one embodiment, the signals are transmitted to the electronic device wirelessly. Thus, the mouse pad 100 further includes a power source to power the touch panel 20, the processor 30, and the wireless communication.

A material of the body 10 can be metal(s), alloys, resins or plastics. When the material of the body 10 is flexible resins or flexible plastics, the mouse pad 100 can have certain flexibility.

Figure 4:
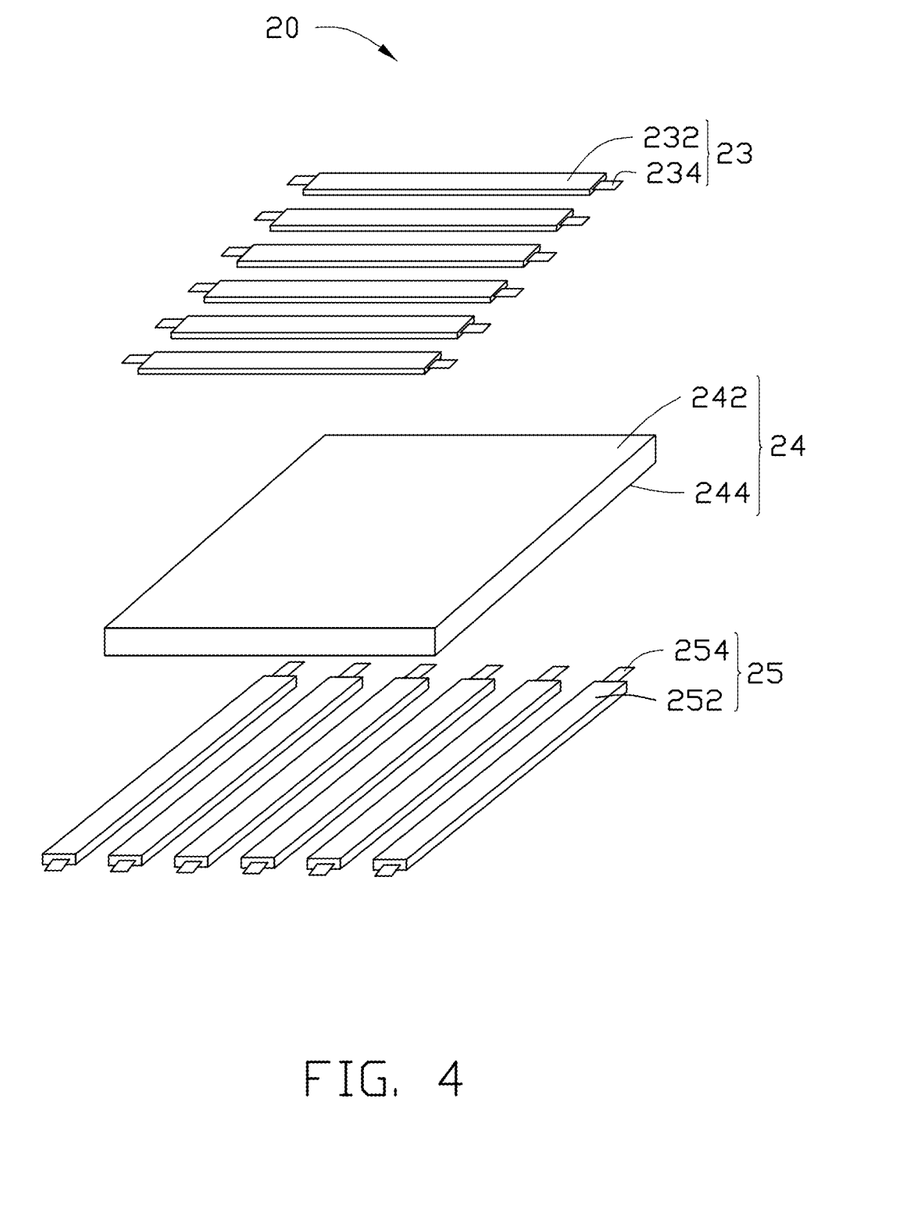
FIG. 4 is a schematic view of one embodiment of touch panel of a mouse pad.

The touch panel 20 can be a multi-touch capacitive touch panel, a multi-touch resistive touch panel, a pressure sensitive touch panel, an infrared touch panel, or combinations thereof. Referring to FIG. 4, in one embodiment, the touch panel 20 is a multi-touch capacitive touch panel. The multi-touch capacitive touch panel includes a first electrode layer 23, a substrate 24 and a second electrode layer 25. The substrate 24 includes a first surface 242 and a second surface 244. The first electrode layer 23 is located on the first surface 242. The second electrode layer 25 is located on the second surface 244. The first electrode layer 23 includes a number of first conductive strips 232 parallel with each other and a number of first electrodes 234 electrically connected to the ends of the first conductive strips 232. The second electrode layer 25 includes a number of second conductive strips 252 parallel with each other and a number of second electrodes 254 electrically connected to the ends of the second conductive strips 252. An angle α between the first conductive strips 232 and second conductive strips 252 is in a range from about 0 degrees to about 90 degrees. In one embodiment, the angle α between the first conductive strips 232 and second conductive strips 252 is about 90 degrees, that is, the first conductive strips 232 are substantially perpendicular to the second conductive strips 252.

A material of the substrate 24 can be a transparent material having good ductility, such as polycarbonate (PC), polymethyl methacrylate (PMMA), polyethylene glycol terephthalate (PET), polyether sulfone (PES), cellulose ester, benzocyclobutene (BCB), polyvinylchloride (PVC) or acrylic resin. The material of the substrate 24 can also be glass, quartz, diamond or other inflexible materials.

The first conductive strips 232 and second conductive strips 252 can have certain transparent, and a material of the first conductive strips 232 and second conductive strips 252 can be metals, indium tin oxide (ITO), or carbon nanotubes. In one embodiment, the first conductive strips 232 and the second conductive strips 252 are a number of transparent carbon nanotube layers. The transparent carbon nanotube layers consists of a number of carbon nanotubes oriented along a length direction of the first conductive strips 232 or the second conductive strips 252. The carbon nanotubes are joined end-to-end by van der Waals attractive force therebetween along the length direction of the first conductive strips 232 or the second conductive strips 252

The transparent carbon nanotube layers include at least a carbon nanotube film drawn from a carbon nanotube array.

Figure 5:
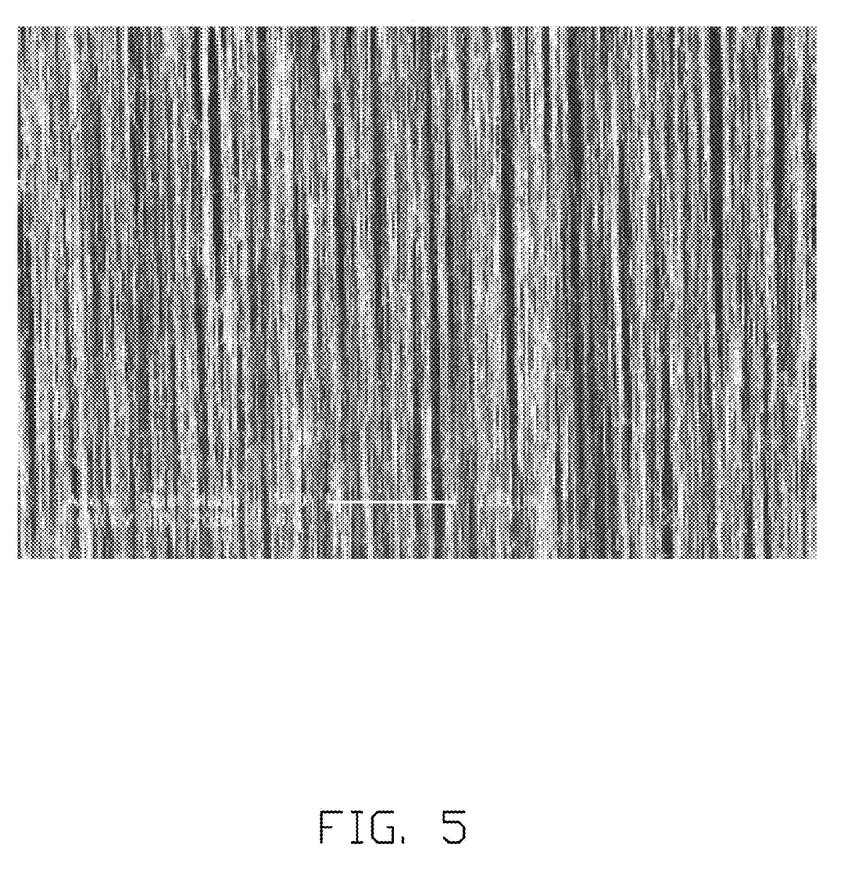
FIG. 5 is a scanning electron microscope (SEM) image of a drawn carbon nanotube film.

Referring to FIG. 5, the carbon nanotube film consists of a number of carbon nanotubes. A large number of the carbon nanotubes in the carbon nanotube film can be oriented along a preferred orientation, meaning that a large number of the carbon nanotubes in the carbon nanotube film are arranged substantially along the same direction. The arranged orientations of a large number of the carbon nanotubes are substantially parallel to the surface of the carbon nanotube film. An end of one carbon nanotube is joined to another end of an adjacent carbon nanotube arranged substantially along the same direction by van der Waals attractive force. A small number of the carbon nanotubes are randomly arranged in the carbon nanotube film, and has a small if not negligible effect on the larger number of the carbon nanotubes in the carbon nanotube film arranged substantially along the same direction. The carbon nanotube film is capable of forming a free-standing structure. The term "free-standing structure" can be defined as a structure that does not have to be supported by a substrate. For example, a free-standing structure can sustain the weight of itself when it is hoisted by a portion thereof without any significant damage to its structural integrity. So, if the carbon nanotube film is placed between two separate supporters, a portion of the carbon nanotube film, not in contact with the two supporters, would be suspended between the two supporters and yet maintain film structural integrity. The free-standing structure of the carbon nanotube film is realized by the successive carbon nanotubes joined end to end by van der Waals attractive force. Microscopically, the carbon nanotubes oriented substantially along the same direction may not be perfectly aligned in a straight line, and some curve portions may exist. It can be understood that some carbon nanotubes located substantially side by side and oriented along the same direction in contact with each other cannot be excluded.

In one embodiment, the first conductive strips 232 and second conductive strips 252 are made of carbon nanotubes, the substrate 24 is made of flexible materials, and the mouse pad 100 can have characteristics of ductility and portability. In another embodiment, the body 10, substrate 24, the first conductive strips 232 and second conductive strips 252 are transparent, and the mouse pad 100 can be a transparent or semitransparent structure.

The mouse pad can further include a protective layer located on a surface of the touch panel 20. A material of the protective layer can be silicon nitride, silicon oxide, styrene-acrylic cyclobutene (BCB), polyester, or acrylic resin.

Methods for using the mouse pad 100 are described below.

In one embodiment, a method for using the mouse pad 100 comprises steps of: obtaining a single short signal in one touched location by the processor 30, such as a single signal in one second; and imputing a click command to the electronic device by the processor 30. Thus, an icon of the electronic device can be selected or a cursor of the electronic device can be located in a certain place.

In another embodiment, a method for using the mouse pad 100 comprises steps of: obtaining a single moving signal by the processor 30; and imputing a moving command to the electronic device by the processor 30. Thus, the cursor of the electronic device can be moved to a certain place.

In some embodiments, a method for using the mouse pad 100 comprises steps of: obtaining signals at certain intervals on a single touched location by the processor 30, such as two separate signals in one second at one set of coordinates; and imputing a double click command to the electronic device. Thus, a program or a document of the electronic device can be opened.

In some other embodiments, a method for using the mouse pad 100 comprises steps of: obtaining two or three moving signals by the processor 30; and imputing two or three moving commands to the electronic device. Thus, an icon or an image of the electronic device can be enlarged or made smaller.

Figure 6:
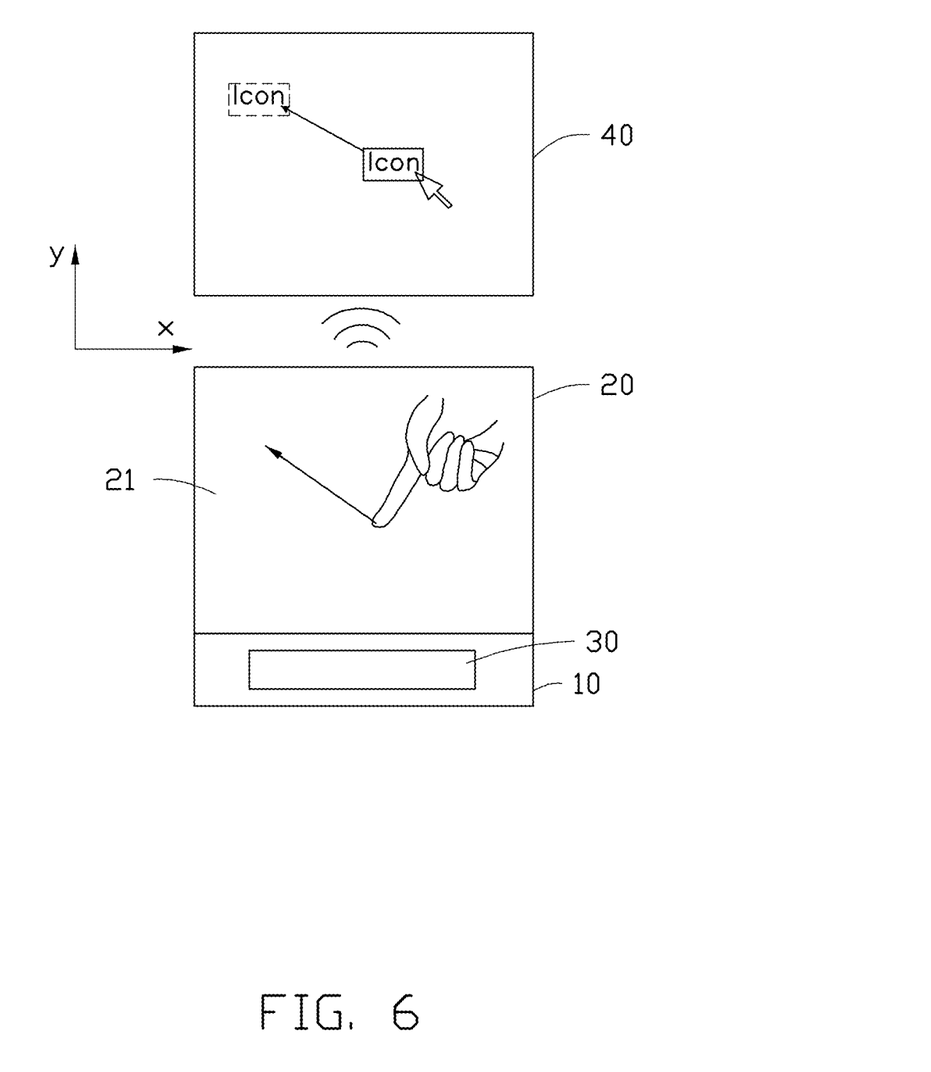
FIG. 6 is a schematic view of one embodiment of a mouse pad in use.

Referring to FIG. 6, a fingertip is pressed on the touch panel 20 to select an icon on a display 40 of the electronic device, and the icon on the display 40 of the electronic device can be then moved to another part of the display 40 by moving the fingertip.

Figure 7:
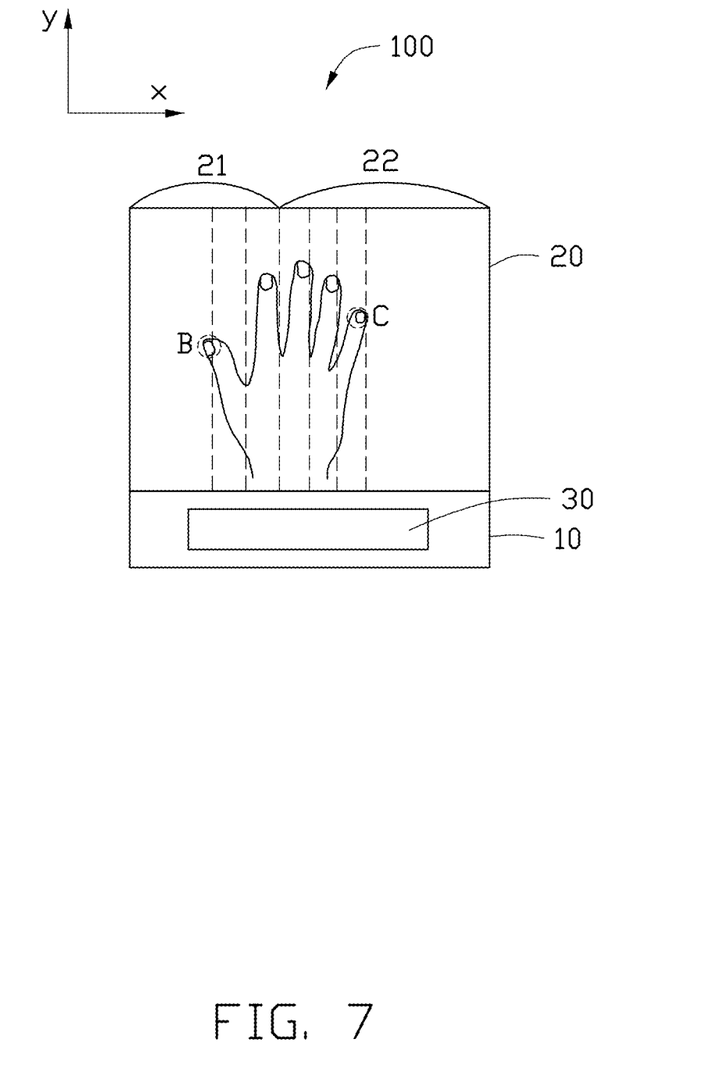
FIG. 7 is a schematic view of another embodiment of a mouse pad in use.

Referring to FIG. 7, in one embodiment, a method for using the mouse pad 100 comprises steps of: obtaining multiple signals by the processor 30 at the same time, such as five or more signals; and dividing the touch panel 20 into only a first area 21 and a second area 22 where each area has a different function. The first area 21 can be used as a left mouse button, that is, an icon can be selected by clicking the first area 21 or a cursor of the electronic device can be relocated to a certain place by moving a fingertip within the first area 21. The second area 22 can be used as a right mouse button, that is to display a taskbar or a drop-down menu by clicking within the second area 22. The first area 21 and the second area 22 can be located on different areas according to different coordinates of the multiple signals.

The first area 21 and the second area 22 can be defined by steps of: obtaining multiple signals by the processor 30 when the mouse pad 100 is operated by a hand; obtaining a shape, a coordinate and a size of the hand by the processor 30 according to the multiple signals; and defining the first area 21 and the second area 22 according to the coordinates and the size of the hand.

In one embodiment, when the mouse pad 100 is operated by a right hand, a touch point B $(X_B, Y_B)$ having a minimum abscissa and a touch point C $(X_C, Y_C)$ having a maximum abscissa can be obtained the processor 30; thus, any area of touch panel 20 having an abscissa less than about $X_B + 2/5(X_C - X_B)$ can be defined as the first area 21 and any area of touch panel 20 having an abscissa greater than about $X_B + 2/5(X_C - X_B)$ can be defined as the second area 22. The touch point B $(X_B, Y_B)$ can be the touch point of the thumb, and the touch point C $(X_C, Y_C)$ can be the touch point of the pinkie. When the right hand operated on the mouse pad 100 is oriented lengthwise along X coordinate, a touch point B $(X_B, Y_B)$ having a minimum ordinate and a touch point C $(X_C, Y_C)$ having a maximum ordinate can be obtained by the processor 30; thus an area of touch panel 20 having an ordinate less than about $Y_B + 2/5(Y_C - Y_B)$ can be defined as the first area 21 and an area of touch panel 20 having an ordinate greater than about $Y_B + 2/5(Y_C - Y_B)$ can be defined as the second area 22.

The mouse pad of the present invention has the following characteristics. First, the user can achieve the functions of an ordinary mouse by touching the mouse pad without constantly grasping the ordinary mouse. Thus, repetitive strain injuries on wrists of the user can be reduced. Second, the first area and the second area can be defined by the hand operations on the mouse pad. Thus, the user can operate the mouse pad easily. Third, when the touch panel and the body are made of flexible materials, the mouse pad can have the characteristics of ductility and portability.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

The invention claimed is:

1. A method for using a mouse pad, the mouse pad comprising a touch panel comprising a touch surface, the method comprising steps of:

simultaneously obtaining five or more touch signals;

obtaining a touch point B $(X_B, Y_B)$ and a touch point C $(X_C, Y_C)$ from the five or more touch signals, the touch point B $(X_B, Y_B)$ having a minimum ordinate and the touch point C $(X_C, Y_C)$ having a maximum ordinate in the more than five touch signals; and dividing the touch surface into only a first area and a second area according to the touch point B $(X_B, Y_B)$ and the touch point C $(X_C, Y_C)$ to form the first area as a left mouse button area for selecting an icon of an electronic device by clicking the first area, and to form the second area as a right mouse button area for displaying a taskbar or a drop-down menu of the electronic device by clicking within the second area;

wherein locations of the first area and the second area in the touch surface change with coordinates of the touch point B $(X_B, Y_B)$ and the touch point C $(X_C, Y_C)$, and any area of the touch surface having an ordinate less than about $Y_B + 2/5(Y_C - Y_B)$, is defined as the first area; and any area of the touch surface having an ordinate greater than about $Y_B + 2/5 (Y_C - Y_B)$, is defined as the second area.

2. The method of claim 1, wherein the mouse pad receives input from a hand of an user, and the touch point B $(X_B, Y_B)$ is the touch point corresponding to a thumb of the user, and the touch point C $(X_C, Y_C)$ is the touch point corresponding to a pinkie of the user.

3. A method for using a mouse pad, the mouse pad comprising a touch panel comprising a touch surface, the method comprising steps of:

obtaining five or more touch signals simultaneously occurring on the touch surface;

obtaining a touch point B $(X_B, Y_B)$ and a touch point C $(X_C, Y_C)$ from the five or more touch signals, the touch point B $(X_B, Y_B)$ having a minimum abscissa and the touch point C $(X_C, Y_C)$ having a maximum abscissa in the more than five touch signals; and dividing the touch surface such that the touch surface consisting of a first area and a second area according to the touch point B $(X_B, Y_B)$ and the touch point C $(X_C, Y_C)$ to form the first area as a left mouse button area for selecting an icon of an electronic device by clicking the first area, and to form the second area as a right mouse button area for displaying a taskbar or a drop-down menu of the electronic device by clicking within the second area;

wherein locations of the first area and the second area in the touch surface change with coordinates of the touch point B $(X_B, Y_B)$ and the touch point C $(X_C, Y_C)$, any area of the touch surface, having an abscissa less than about $X_B + 2/5 (X_C - X_B)$, is defined as the first area; and any area of the touch surface, having an abscissa greater than about $X_B + 2/5 (X_C - X_B)$ is defined as the second area.

* * * * *